3,233,035
CABLE SPLICE CLOSURE
Jane A. Black, San Francisco, Calif., assignor to
Sta-Crete Inc., a corporation of California
Filed Oct. 10, 1963, Ser. No. 315,285
1 Claim. (Cl. 174—93)

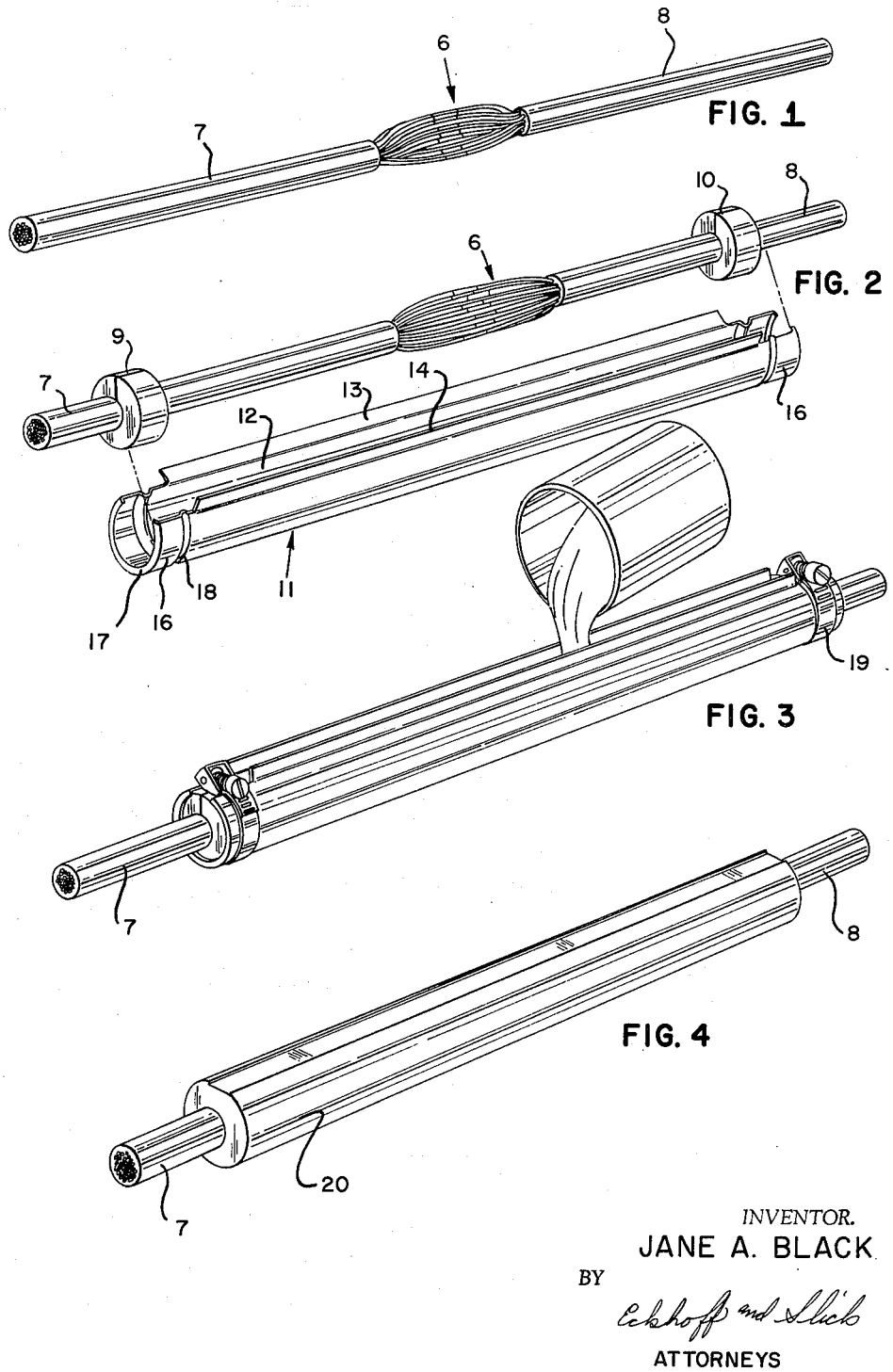

This invention relates to the provision of a closure about a splice in a cable containing a plurality of insulated wires. Any cable has an ultimate length and when it is desired to join a length of cable to another length the problem arises of providing suitable protection for the splice.

In accordance with the present invention I provide a simple, permanently encapsulated splice closure that can be used for all splice and pressure access configurations required for plastic communications cable. The device and system of the present invention provide a highly reliable and maintenance free closure for straight or multiple splices, pressure plugs or dams, cable sheath repairs, air pressure test points, and pressure contractor alarms.

In the drawing accompanying and forming a part hereof I have shown a preferred apparatus and method of encapsulating a splice of two cables in which FIGURE 1 shows two cables spliced together with the splice ready for sealing.

FIGURE 2 is a composite view showing an intermediate step in the assembly of the equipment necessary for the practice of the invention.

FIGURE 3 is a view illustrating a step in the completion of encapsulating the splice.

FIGURE 4 is a perspective view of the completed splice with the apparatus utilized in the encapsulating removed.

In practicing the invention, the splice indicated at 6 is made between the several insulated wires in the two lengths 7 and 8 of a suitable cable. The cables joined can be of any type and can, for example, be mixed. Also, the cable can include conductors of any gauge and can include lead, polyethylene, aluminum or any other type of outer cover.

With the splice 6 made in the usual manner (this includes covering the spliced wires with a suitable tape covering which is not shown) and with the two lengths of cable axially aligned, annular split seal rings 9 and 10 are placed respectively on cable lengths 7 and 8 on opposite sides of the splice 6. The split rings are of such internal diameter that they fit the cable lengths snugly. With the rings 9 and 10 in place, the next step is the placement of the encapsulating trough 11. This trough includes a top opening 12 defined by outwardly extending wings 13 and 14. At each end the encapsulating trough is provided with clamp receptacles 16 defined by opposite grooves 17 and 18. The clamp receptacles are spaced apart a distance corresponding to the spacing between the split rings 9 and 10, the rings fitting snugly between the grooves 17 and 18. Suitable clamps 19 are engaged on each clamp receptacle 16 and are made up tight to bring each clamp receptacle 16 into tight engagement with a split ring 9 or 10 and with the opening 12 positioned horizontally.

With the apparatus assembled as has been described, the space between the encapsulating container 11 and the lengths of cable is filled with a liquid epoxy resin. The composition of this resin is chosen so that its setting temperature is low enough to prevent any harm to the splice conductors or the insulation provided upon them.

In practice, the encapsulating apparatus is preferably left in place as in FIGURE 3. However, in FIGURE 4, I have shown it removed to illustrate the form and shape of the completed encapsulation 20. The choice of such a composition is within the skill of those versed in epoxy resins.

The epoxy resin sets up and provides a seal about the splice which is usually stronger than the cable itself and which is able to withstand a great range of climatic conditions including temperatures from −40° F. to 140° F. and above, is water tight so that soil alkalis and acids have no effect upon the joint. In one test, the joint was subject to 100 lbs. per square inch air pressure for 10 days with no leakage occurring. The cable sheath failed on the tenth day but the encapsulation remained intact. In addition, the enclosure will stand as much if not more pull than the cable.

I claim:

A cable splice closure apparatus for joining two lengths of axially aligned insulated wire cable in which the wires have been spliced together comprising:
 (a) a pair of split rings mounted one upon each length of cable on opposite sides of the splice;
 (b) a single piece encapsulating trough mounted upon the split rings and extending therebetween, said trough having an opening along one side thereof, said trough having interior grooves at each end thereof fitting over the split rings;
 (c) clamp means joining each end of said trough to the rings enclosing the splice; and
 (d) an encapsulating material filling said trough.

References Cited by the Examiner

UNITED STATES PATENTS

| 2,923,762 | 2/1960 | Falkenstein | 174—77 X |
| 2,930,835 | 3/1960 | Bollmeier | 174—76 |

FOREIGN PATENTS

| 1,168,267 | 8/1958 | France. |
| 243,834 | 12/1925 | Great Britain. |

JOHN F. BURNS, *Primary Examiner.*
JOHN P. WILDMAN, *Examiner.*